United States Patent
Endo

(10) Patent No.: US 7,567,356 B2
(45) Date of Patent: Jul. 28, 2009

(54) IMAGE FORMING DEVICE

(75) Inventor: Yoshinori Endo, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1036 days.

(21) Appl. No.: 10/690,529

(22) Filed: Oct. 23, 2003

(65) Prior Publication Data

US 2005/0018239 A1 Jan. 27, 2005

(30) Foreign Application Priority Data

Oct. 23, 2002 (JP) ............................. 2002-308258

(51) Int. Cl.
*G06F 15/00* (2006.01)
(52) U.S. Cl. .................. 358/1.14; 358/1.1; 358/1.13
(58) Field of Classification Search ................. 713/320; 358/1.1, 1.13, 1.14, 1.15, 401, 501
See application file for complete search history.

(56) References Cited

U.S. PATENT DOCUMENTS

| | | | | |
|---|---|---|---|---|
| 5,495,559 A | * | 2/1996 | Makino | 358/1.13 |
| 5,602,975 A | * | 2/1997 | Kataoka et al. | 358/1.16 |
| 6,038,375 A | * | 3/2000 | Makino | 358/1.13 |
| 6,407,826 B2 | * | 6/2002 | Hashimoto et al. | 358/296 |
| 6,654,895 B1 | * | 11/2003 | Henkhaus et al. | 713/320 |
| 6,693,717 B1 | * | 2/2004 | Teradaira et al. | 358/1.14 |
| 2002/0114001 A1 | * | 8/2002 | Oyanagi | 358/1.15 |

FOREIGN PATENT DOCUMENTS

| | | |
|---|---|---|
| JP | A 05-035379 | 2/1993 |
| JP | A-5-274094 | 10/1993 |
| JP | A-6-210907 | 8/1994 |
| JP | A 08-324071 | 12/1996 |
| JP | A 09-198108 | 7/1997 |
| JP | A-9-314957 | 12/1997 |
| JP | A 11-167442 | 6/1999 |
| JP | A-2000-322218 | 11/2000 |
| JP | A-2000-326498 | 11/2000 |

* cited by examiner

*Primary Examiner*—Kimberly A Williams
(74) *Attorney, Agent, or Firm*—Oliff & Berridge, PLC

(57) ABSTRACT

When an auto-select program is executed in a reset process control program of a laser printer, an input prime signal valid mode is selected when the laser printer is not in sleep mode. Accordingly, the laser printer executes a reset process upon in response to an input prime signal. However, an input prime signal invalid mode is selected when the laser printer is in sleep mode. As a result, the laser printer ignores input prime signals. In this way, a user can prevent undesirable execution of the reset process, thereby reducing the number of unnecessary processes and lowering the running cost.

10 Claims, 5 Drawing Sheets

IMAGE FORMING DEVICE

BACKGROUND OF THE INVENTION

1. Field of the Invention

The present invention relates to an image-forming device such as a laser printer.

2. Description of Related Art

Normally an image-forming device such as a laser printer is connected to an external personal computer. A print job created on the personal computer is transmitted to the laser printer via an interface cable. The laser printer executes a printing process based on the print job.

A parallel interface cable is one example of an interface cable well known in the art. The parallel interface cable is an interface cable for parallel transmission that is capable of transmitting a plurality of bits simultaneously. The parallel interface cable includes a plurality of signal wires, one of which transmits an input prime signal. The input prime signal is a reset signal for resetting the laser printer 1.

Normally, when a user inputs a command to cancel a print job, an input prime signal is transferred from the personal computer to the laser printer. An input prime signal is also transmitted from the personal computer to the laser printer when the power supply for the personal computer is turned on. Upon receiving an input prime signal, the laser printer executes a reset process to clear the print data and to perform a warm-up operation.

Ordinarily, the laser printer enters a sleep mode after completing a printing process if a subsequent print job has not been inputted within a prescribed length of time. While the laser printer can still receive print jobs in the sleep mode, power consumption is less than that during a printing process. One method for canceling the sleep mode from the host computer side has been disclosed in Japanese unexamined patent application publication No. HEI-8-324071.

SUMMARY OF THE INVENTION

When the laser printer is connected to the personal computer via a parallel interface cable, the personal computer transmits an input prime signal to the laser printer when the power to the personal computer is turned on. As a result, the laser printer executes the warm-up operation. Even when the laser printer is in the sleep mode, this sleep mode is canceled, regardless of the user's wishes, and the laser printer executes a reset process that includes the warm-up operation.

In view of the foregoing, it is an object of the present invention to provide an image-forming device that is capable of executing a reset process upon receipt of an input prime signal only when a user desires to execute the reset process.

In order to attain the above and other objects, the present invention provides an image forming device connected to an external device, the image forming device comprising: an image forming unit forming images on a recording medium; a reception unit receiving a reset signal transmitted from an external device; a reset process unit executing a reset process to reset the image forming unit; and a reset process control unit selectively controlling the reset process unit to execute the reset process in a manner that the reset process control unit controls, during a reset signal valid mode, the reset process unit to execute the reset process upon receipt of the reset signal and that the reset process control unit ignores, during a reset signal invalid mode, input of the reset signal, and fails to control the reset process unit to execute the reset process.

BRIEF DESCRIPTION OF THE DRAWINGS

The above and other objects, features and advantages of the invention will become more apparent from reading the following description of the preferred embodiments taken in connection with the accompanying drawings in which:

FIG. 3(*b*) is an explanatory diagram showing an example of an LCD display in the laser printer of FIG. 1;

DETAILED DESCRIPTION OF THE PREFERRED EMBODIMENT

Figure 1:
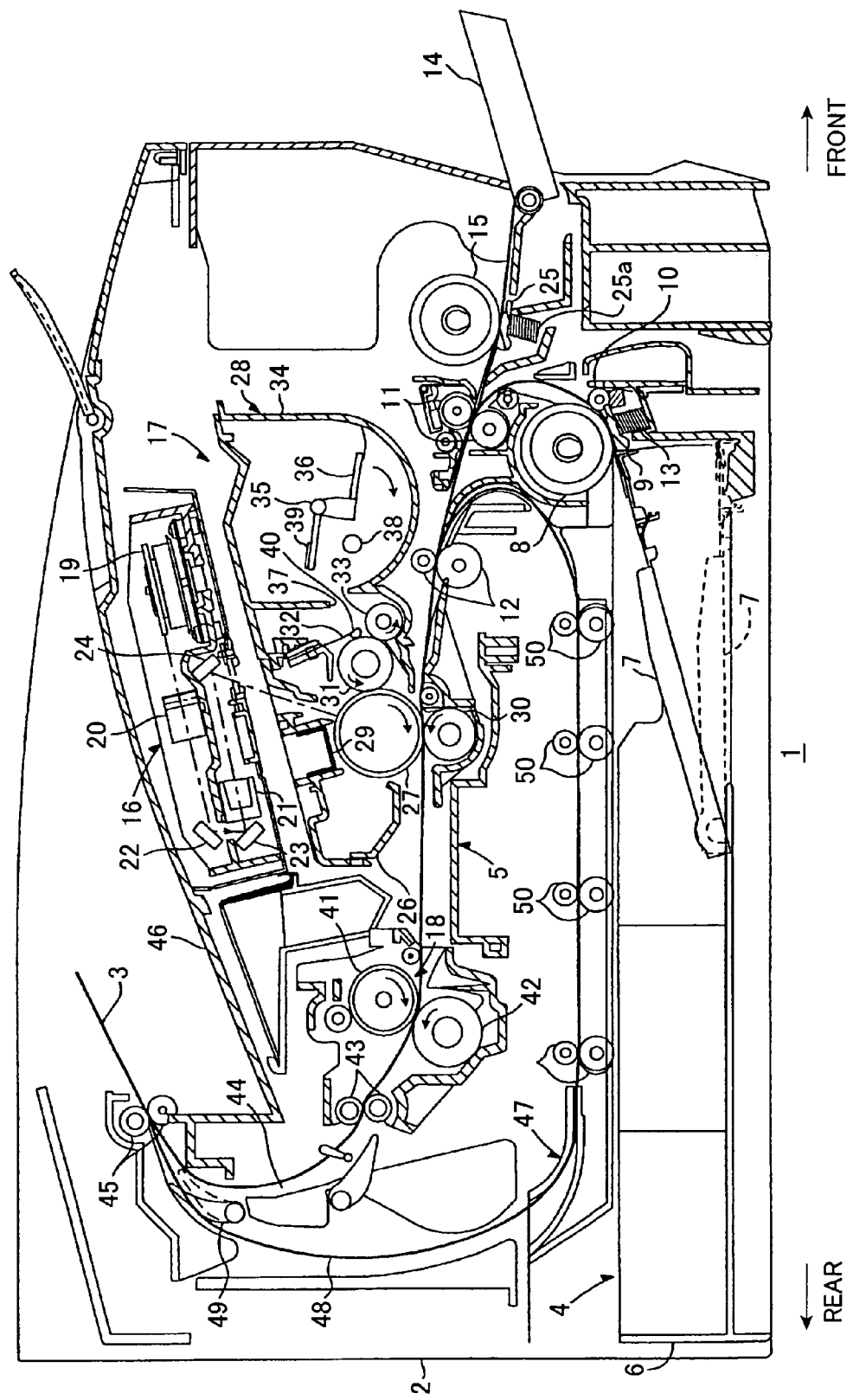
FIG. 1 is a side cross-sectional view showing the relevant parts of a laser printer, serving as the image-forming device according to a preferred embodiment of the present invention.

An image-forming device according to a preferred embodiment of the present invention will be described while referring to the accompanying drawings wherein like parts and components are designated by the same reference numerals to avoid duplicating description.

A laser printer according to an embodiment of the present invention will be described with reference to FIG. 1.

As shown in FIG. 1, the laser printer 1 includes a main casing 2, a feeder unit 4, and an image forming unit 5. The feeder unit 4 and the image forming unit 5 are housed in the main casing 2. The feeder unit 4 supplies sheets 3 to the image forming unit 5. The image forming unit 5 forms desired images on the supplied sheets 3.

The feeder unit 4 is located within the lower section of the main casing 2 and includes a sheet supply tray 6, a sheet pressing plate 7, a sheet supply roller 8, a sheet supply pad 9, paper dust removing rollers 10, 11, and registration rollers 12. The sheet supply tray 6 is detachably mounted with respect to the main casing 2. The sheet pressing plate 7 is pivotally movably provided within the sheet supply tray 6. The sheet supply roller 8 and the sheet supply pad 9 are provided above one end of the sheet supply tray 6. The paper dust removing rollers 10, 11 are disposed downstream from the sheet supply roller 8 with respect to the direction in which the sheets 3 are transported. The registration rollers 12 are provided downstream from the paper dust removing rollers 10, 11 in the sheet transport direction of the sheets 3.

The sheet pressing plate 7 is capable of supporting a stack of sheets 3. The sheet pressing plate 7 is pivotably supported at its end furthest from the supply roller 8 so that the end of the sheet pressing plate 7 that is nearest the supply roller 8 can move vertically. Although not shown in the drawings, a spring for urging the sheet pressing plate 7 upward is provided to the rear surface of the sheet pressing plate 7. Therefore, the sheet pressing plate 7 pivots downward in accordance with increase in the amount of sheets 3 stacked on the sheet pressing plate 7. At this time, the sheet pressing plate 7 pivots around the end of the sheet pressing plate 7 farthest from the sheet supply roller 8, downward against the urging force of the spring. The sheet supply roller 8 and the sheet supply pad 9 are disposed in confrontation with each other. A spring 13 is provided beneath the sheet supply pad 9 for pressing the sheet supply pad 9 toward the sheet supply roller 8. Urging force of the spring under the sheet pressing plate 7 presses the uppermost sheet 3 on the sheet pressing plate 7 toward the supply roller 8 so that rotation of the supply roller 8 moves the uppermost sheet 3 between the supply roller 8 and the separation pad 13. In this way, one sheet 3 at a time is separated from the stack and supplied to the paper dust removing rollers 10, 11. The paper dust removing rollers 10, 11 remove paper dust from the supplied sheets 3 and further convey them to the registration rollers 12. The pair of registration rollers 12 performs a desired registration operation on the supplied sheets 3. Then the sheets 3 are transported to an image formation position. In the image formation position a photosensitive drum 27 and a transfer roller 30 contact each other. In other words, the image formation position is the transfer position where the visible toner image is transferred from the surface of the photosensitive drum 27 to a sheet 3 as the sheet 3 passes between the photosensitive drum 27 and the transfer roller 30.

The feeder unit 4 further includes a multipurpose tray 14, a multipurpose sheet supply roller 15, and a multipurpose sheet supply pad 25. The multipurpose sheet supply roller 15 and the multipurpose sheet supply pad 25 are disposed in confrontation with each other and are for supplying sheets 3 that are stacked on the multipurpose tray 14. A spring 25a provided beneath the multipurpose sheet supply pad 25 presses the multipurpose sheet supply pad 25 up toward the multipurpose sheet supply roller 15. Rotation of the multipurpose sheet supply roller 15 moves sheets 3 one at a time from the stack on the multipurpose tray 14 to a position between the multipurpose sheet supply pad 25 and the multipurpose sheet supply roller 15 so that the sheets 3 on the multipurpose tray 14 can be supplied one at a time to the image formation position.

The image forming section 5 includes a scanner section 16, a process unit 17, and a fixing section 18. The scanner section 16 is provided at the upper section of the casing 2 and is provided with a laser emitting section (not shown), a rotatingly driven polygon mirror 19, lenses 20, 21, and reflection mirrors 22, 23, 24. The laser emitting section emits a laser beam based on desired image data. As indicated by single-dot chain line in FIG. 1, the laser beam passes through or is reflected by the mirror 19, the lens 20, the reflection mirrors 22 and 23, the lens 21, and the reflection mirror 24 in this order so as to irradiate, in a high speed scanning operation, the surface of the photosensitive drum 27 of the process unit 17.

The process unit 17 is disposed below the scanner section 16. The process unit 17 includes a drum cartridge 26 and a development cartridge 28. The drum cartridge 26 can be detached from the main casing 2 and houses the photosensitive drum 27, a scorotron charge unit 29, and a transfer roller 30.

The development cartridge 28 is detachable from the drum cartridge 26 and provided with a developing roller 31, a layer thickness regulating blade 32, a supply roller 33 and a toner hopper 34.

The toner hopper 34 is filled with positively charging, non-magnetic, single-component toner. In the present embodiment, polymerization toner is used as the toner. Polymerization toner has substantially spherical particles and so has an excellent fluidity characteristic. To produce polymerization toner, a polymerizing monomer is subjected to well-known copolymerizing processes, such as suspension polymerization. Examples of a polymerizing monomer include a styrene type monomer or an acrylic type monomer. An example of a styrene type monomer is styrene. Examples of acrylic type monomers are acrylic acid, alkyl (C1-C4) acrylate, and alkyl (C1-C4) metaacrylate. Because the polymerization toner has such an excellent fluidity characteristic, image development is reliably performed so that high-quality images can be formed.

Materials such as wax and a coloring agent are distributed in the toner. The coloring agent can be carbon black, for example. In addition, external additive, such as silica, are added in the toner to further improve the fluidity characteristic. The toner has a particle diameter of about 6-10 μm.

Figure 2:
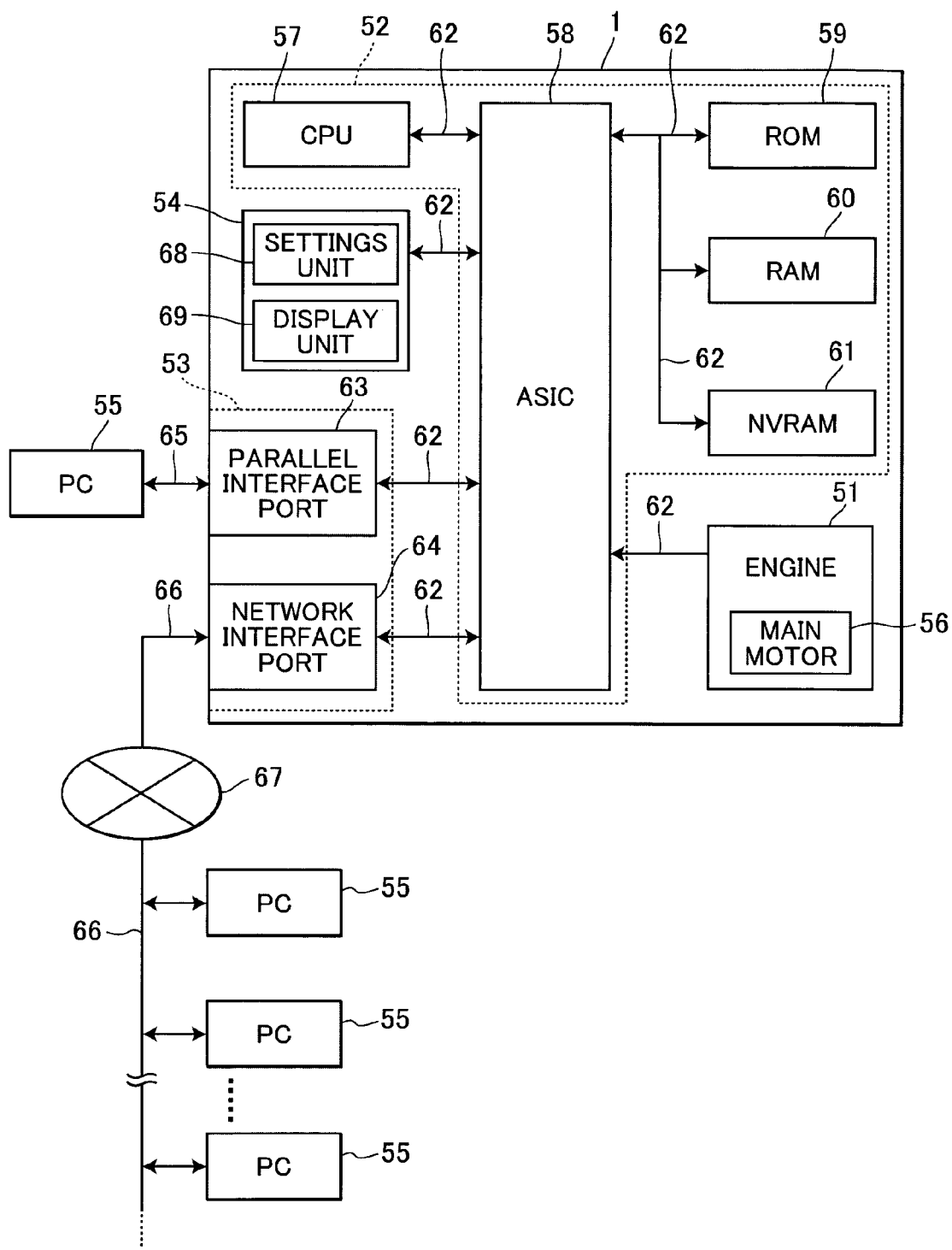
FIG. 2 is a block diagram showing the electrical construction of the laser printer in FIG. 1.

The rotation shaft 35 is disposed in the center of the toner hopper 34. An agitator 36 and a cleaner 39 are supported on the rotation shaft 35. The agitator 36 rotates in the clockwise direction by the power supplied from a main motor 56 (FIG. 2). The agitator 36 agitates the toner in the toner hopper 34 and discharges the toner through the toner supply opening 37 that is opened through the side wall of the toner hopper 34. Windows 38 are formed in the end walls that define the lengthwise ends of the toner hopper 34. The windows 38 are used to detect the amount of toner remaining in the toner hopper 34. The cleaner 39 cleans the windows 38 as the agitator 36 rotates.

The supply roller 33 is located on the side of the toner supply opening 37. The developing roller 31 is located confronting the supply roller 33. The supply roller 33 and the developing roller 31 are rotatable in the counterclockwise direction. The supply roller 33 and the developing roller 31 are disposed in abutment contact with each other so that both are compressed to a certain extent.

The supply roller 33 includes a metal roller shaft covered with a roller formed from an electrically conductive sponge material. The supply roller 33 rotates in the counterclockwise direction by the power supplied from the main motor 56.

The developer roller 31 includes a metal roller shaft and a roller portion covered thereon. The roller portion is made from a resilient member formed from a conductive rubber material. In more specific terms, the roller portion of the developing roller 31 is made from conductive silicone rubber or urethane rubber including, for example, carbon particles. The surface of the roller portion is covered with a coating layer of silicone rubber or urethane rubber that contains fluorine. The developing roller 31 is applied with a predetermined developing bias with respect to the photosensitive drum 27. The developing roller 31 rotates in the counterclockwise direction according to the power supplied from the main motor 56.

The layer thickness regulating blade 32 is disposed near the developing roller 31. The layer thickness regulating blade 32 includes a blade made from a metal leaf spring, and has a pressing member 40, that is provided on a free end of the blade. The pressing member 40 has a semi-circular shape when viewed in cross section. The pressing member 40 is formed from silicone rubber with electrically insulating properties. The layer thickness regulating blade 32 is supported by the developing cartridge 28 at a location near the developing roller 31. The resilient force of the blade presses the pressing member 40 against the surface of the developing roller 31.

Then rotation of the supply roller 33 supplies the developing roller 31 with the toner that has been discharged through the toner supply opening 37. At this time, the toner is triboelectrically charged to a positive charge between the supply roller 33 and the developing roller 31. Then, as the developing roller 31 rotates, the toner supplied onto the developing roller 31 moves between the developing roller 31 and the pressing member 40 of the layer thickness regulating blade 32. This reduces thickness of the toner on the surface of the developing roller 31 down to a thin layer of uniform thickness.

The photosensitive drum 27 is disposed to the side of and in confrontation with the developing roller 31. The photosensitive drum 27 is rotatable in the clockwise direction. The photosensitive drum 27 includes a drum-shaped member and a surface layer. The drum-shaped member is connected to ground. The surface layer is formed on the drum-shaped member from a photosensitive layer that is made from polycarbonate and that has a positively charging nature. The photosensitive drum 27 rotates in the clockwise direction according to the power supplied from the main motor 56.

The scorotoron charge unit 29 is disposed above the photosensitive drum 27 and is spaced away from the photosensitive drum 27 by a predetermined space so as to avoid direct contact with the photosensitive drum 27. The scorotron charge unit 29 is a positive-charge scorotron type charge unit for generating a corona discharge from a charge wire made from, for example, tungsten, to form a blanket of positive-polarity charge on the surface of the photosensitive drum 27.

The transfer roller 30 is rotatably supported in the drum cartridge 26 at a position below and in confrontation with the photosensitive drum 27. The transfer roller 30 is rotatable in the counterclockwise direction. The transfer roller 30 includes a metal roller shaft and a roller portion covering the shaft and made from electrically-conductive rubber material. At times of toner image transfer, the transfer roller 30 is applied with a predetermined transfer bias with respect to the photosensitive drum 27. The transfer roller 30 rotates in the counterclockwise direction according to the power supplied from the main motor 56.

The scorotoron charge unit 29 forms a blanket of positive charge on the surface of the photosensitive drum 27 as the photosensitive drum 27 rotates. Then, the surface of the photosensitive drum 27 is exposed to high speed scan of the laser beam from the scanner section 16. The electric potential of the positively charged surface of the photosensitive drum 27 drops at positions exposed to the laser beam. As a result, an electrostatic latent image is formed on the photosensitive drum 27 based on desired image data used to drive the laser beam. Next, an inverse developing process is performed. That is, as the developing roller 31 rotates, the positively-charged toner borne on the surface of the developing roller 31 is brought into contact with the photosensitive drum 27. At this time, the toner on the developing roller 31 is supplied to lower-potential areas of the electrostatic latent image on the photosensitive drum 27. As a result, the toner is selectively borne on the photosensitive drum 27 so that the electrostatic latent image is developed into a visible toner image.

Thereafter, the visible toner image borne on the surface of the photosensitive drum 27 is transferred to a sheet 3 according to the transfer bias applied to the transfer roller 30 as the sheet 3 passes between the photosensitive drum 27 and the transfer roller 30.

The fixing section 18 is disposed downstream from the process unit 17 and includes a thermal roller 41, a pressing roller 42, and transport rollers 43. The pressing roller 42 presses against the thermal roller 41. The transport rollers 43 are provided downstream from the thermal roller 41 and the pressing roller 42. The thermal roller 41 includes a metal tube and a halogen lamp disposed therein. The thermal roller 41 rotates in the clockwise direction by the power supplied from the main motor 56. The pressing roller 42 rotates in the counterclockwise direction following the thermal roller 41 as being pressed against the thermal roller 41. The halogen lamp is energized by the power from the main motor 56. The halogen lamp heats up the metal tube so that toner that has been transferred onto sheet 3 in the process unit 17 is thermally fixed onto the sheet 3 as the sheet 3 passes between the thermal roller 41 and the pressing roller 42. Afterward, the sheet 3 is transported to a sheet-discharge path 44 by the transport rollers 43 and discharged onto a sheet-discharge tray 46 by sheet-discharge rollers 45.

In this way, the laser printer 1 performs the printing process for each page in a printing job inputted from PC 55 (FIG. 2).

The laser printer 1 is further provided with an inverting transport unit 47 for inverting sheets 3 that have been printed on once and for returning the sheets 3 to the image forming unit 5 so that images can be formed on both sides of the sheets 3. The inverting transport unit 47 includes the sheet-discharge rollers 45, an inversion transport path 48, a flapper 49, and a plurality of inversion transport rollers 50.

The sheet-discharge rollers 45 are a pair of rollers that can be rotated selectively forward or in reverse. The sheet-discharge rollers 45 are rotated forward to discharge sheets 3 onto the sheet-discharge tray 46 and rotated in reverse when sheets are to be inverted.

The inversion transport rollers 50 are disposed below the image forming unit 5. The inversion transport path 48 extends vertically between the sheet-discharge rollers 45 and the inversion transport rollers 50. The upstream end of the inversion transport path 48 is located near the sheet-discharge rollers 45 and the downstream end is located near the inversion transport rollers 50 so that sheets 3 can be transported downward from the sheet-discharge rollers 45 to the inversion transport rollers 50.

The flapper 49 is swingably disposed at the junction between the sheet-discharge path 44 and the inversion transport path 48. By activating or deactivating a solenoid (not shown), the flapper 49 can be selectively swung between the orientation shown in broken line and the orientation shown by solid line in FIG. 1. The orientation shown in solid line in FIG. 1 is for transporting sheets 3 that have one side printed to the sheet-discharge rollers 45. The orientation shown in broken line in FIG. 1 is for transporting sheets from the sheet-discharge rollers 45 into the inversion transport path 48, rather than back into the sheet-discharge path 44.

The inversion transport rollers 50 are aligned horizontally at positions above the sheet supply tray 6. The pair of inversion transport rollers 50 that is farthest upstream is disposed near the rear end of the inversion transport path 48. The pair of inversion transport rollers 50 that is located farthest downstream is disposed below the registration rollers 12.

The inverting transport unit 47 operates in the following manner when a sheet 3 is to be formed with images on both sides. A sheet 3 that has been formed on one side with an image is transported by the transport rollers 43 from the sheet-discharge path 44 to the sheet-discharge rollers 45. The sheet-discharge rollers 45 rotate forward with the sheet 3 pinched therebetween until almost all of the sheet 3 is transported out from the laser printer 1 and over the sheet-discharge tray 46. The forward rotation of the sheet-discharge rollers 45 is stopped once the rear-side end of the sheet 3 is located between the sheet-discharge rollers 45. Then, the sheet-discharge rollers 45 are driven to rotate in reverse while at the same time the flapper 49 is switched to change transport direction of the sheet 3 toward the inversion transport path 48. As a result, the sheet 3 is transported into the inversion transport path 48. The flapper 49 reverts to its initial position once transport of the sheet 3 to the inversion transport path 48 is completed. That is, the flapper 49 switches back to the position for transporting sheets from the transport rollers 43 to the sheet-discharge rollers 45. Next, the inverted sheet 3 is transported through the inversion transport path 48 to the inversion transport rollers 50 and then upward from the inversion transport rollers 50 to the registration rollers 12. The registration rollers 12 align the front edge of the sheet 3. Afterward, the sheet 3 is transported toward the image formation position. At this time, the upper and lower surfaces of the sheet 3 are reversed from the first time that an image has been formed on the sheet 3 so that an image can be formed on the other side as well. In this way, images are formed on both sides of the sheet 3.

FIG. 2 is a block diagram showing the electrical construction of the laser printer 1.

As shown in FIG. 2, the laser printer 1 includes an engine 51, a control circuit board 52, an interface 53, and an operating panel 54. The engine 51 includes the main motor 56; and the above-described mechanical components, including the agitator 36, the supply roller 33, the developing roller 31, the photosensitive drum 27, the transfer roller 30, the thermal roller 41, and the halogen lamp (not shown) for heating the thermal roller 41. These mechanical components are driven by the main motor 56 in order to execute the printing process as described above.

After completing printing processes for all the print jobs inputted to the laser printer 1, the laser printer 1 shifts to a sleep mode if no subsequent print jobs have been inputted within a prescribed length of time. The sleep mode is set according to a sleep mode control program. The sleep mode suspends all activity of the mechanical components in the engine 51, while still enabling the laser printer 1 to receive print jobs. The laser printer 1 consumes less power during the sleep mode than during a printing process. A settings unit 68 (to be described later) enables a user to set the length of the prescribed time that the laser printer 1 has to wait after completing a printing process before entering the sleep mode. In this example, the prescribed time is a value between 1 and 99 minutes. The end of a printing process is the point in time that the paper 3 on which the final page of the print job has been printed is discharged onto the discharge tray 46 and the main motor 56 halts.

The sleep mode is canceled when a subsequent print job is inputted, when the settings unit 68 of the operating panel 54 is manipulated to input the user's desired settings, such as canceling of the sleep mode, and when one of several covers (not shown) provided on the main casing 2 is opened or closed. The sleep mode is selectively canceled when an input prime signal is inputted to the laser printer 1 as will be described later.

The control circuit board 52 includes a CPU 57, an ASIC 58, a ROM 59, a RAM 60, and a NVRAM 61. The CPU 57 forms the center of control and is connected to the ASIC 58 via a bus 62.

The ASIC 58 is an integrated circuit for connecting the CPU 57, ROM 59, RAM 60, NVRAM 61, engine 51, interface 53, and operating panel 54. The ASIC 58 is connected to the CPU 57, ROM 0.59, RAM 60, and NVRAM 61 in the control circuit board 52 via buses 62. The ASIC 58 is also connected to the engine 51, the interface 53, and the operating panel 54 outside the control circuit board 52 via other buses 62.

Figure 4:
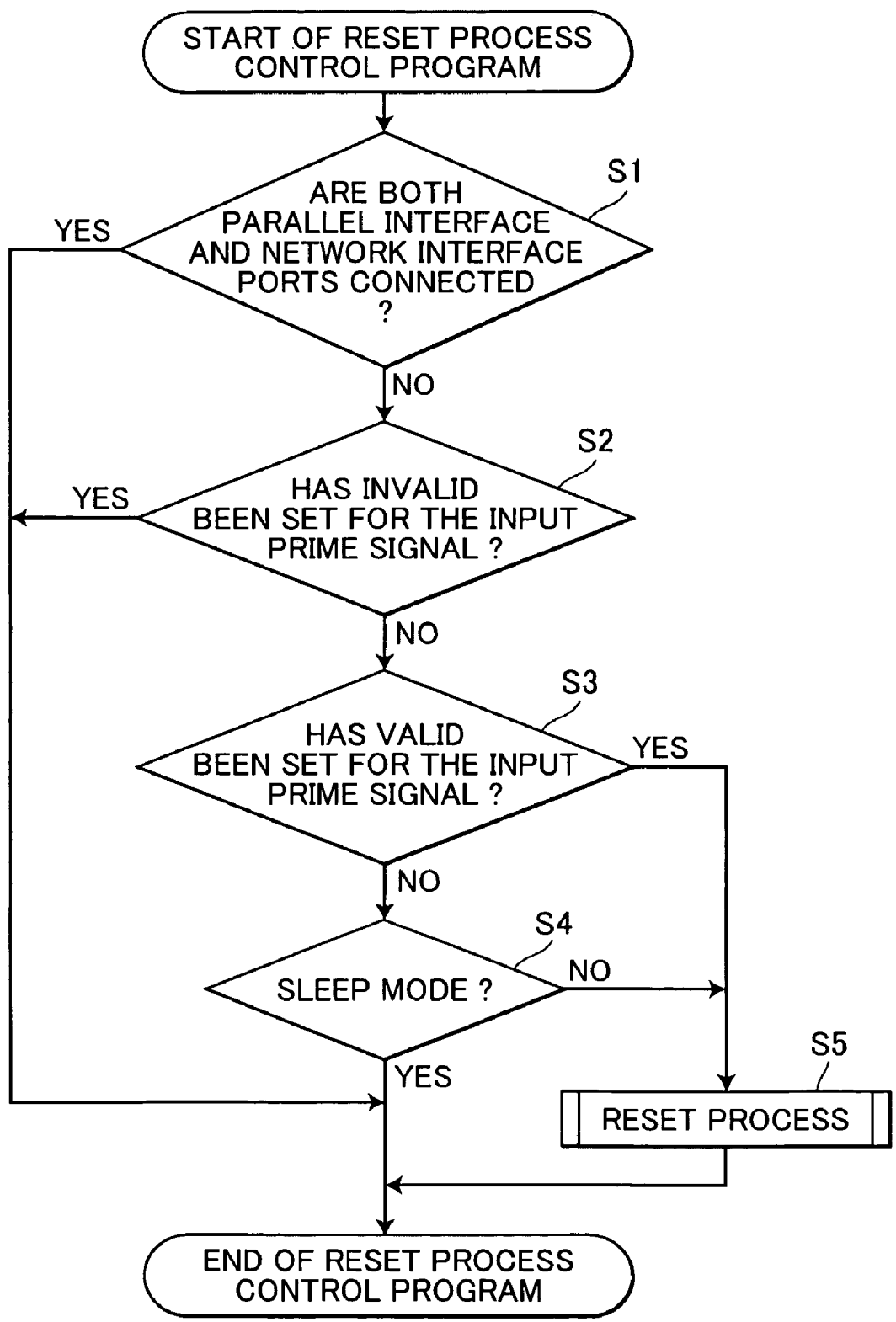
FIG. 4 is a flowchart showing the steps executed according to a reset process control program.

The ROM 59 stores various programs for controlling the laser printer 1. These programs include: a print control program for executing a printing process, a reset process program (FIG. 5), and a reset process control program (FIG. 4). The programs further include: an input prime signal invalid mode auto-select program, an input prime signal invalid mode selection program, an input prime signal valid mode selection program, and an auto-select program. The programs further include: a print data initialization program, a print settings data initialization program, a sleep mode control program, and a warm-up process program.

The RAM 60 is memory that temporarily stores various data including numerical values. The RAM 60 also temporarily stores print jobs inputted from personal computers 55.

The NVRAM 61 is a nonvolatile memory. Data stored in the NVRAM 61 is not lost when the laser printer 1 is reset or when power to the laser printer 1 is switched off. The NVRAM 61 stores data of a page counter.

The interface 53 is provided with a parallel interface port 63 and a network interface port 64. In the present embodiment, the parallel interface port 63 is a SCSI port or other connection port that employs a method of connection well known in the art. A parallel interface cable 65 is connected to the parallel interface port 63. The laser printer 1 is connected to the personal computer 55, which is an external device, via the parallel interface cable 65.

The parallel interface cable 65 is an interface cable for parallel transmission that is capable of transmitting a plurality of bits simultaneously. The parallel interface cable 65 includes a plurality of signal wires, one of which transmits an input prime signal. The input prime signal is a reset signal for resetting the laser printer 1.

Normally, the input prime signal is transmitted to the parallel interface port 63 when the power of the personal computer 55 is switched on, when the personal computer 55 is rebooted, and when the user inputs a cancel command to the personal computer 55. The signal is transmitted via the signal wire of the parallel interface cable 65 that is provided for transmitting the input prime signal. In this way, since the interface 53 can receive an input prime signal transmitted from the personal computer 55 via the parallel interface cable 65, the CPU 57 can reliably monitor input prime signals with a simple construction and can use these signals to trigger the reset process.

In the preferred embodiment, the network interface port 64 is a LAN port, a modem port, or other connection port that employs a method of connection well known in the art. A network cable 66, such as a LAN cable, is connected to the network interface port 64. The laser printer 1 is connected to a network 67 via the network cable 66. The laser printer 1 is connected to various personal computers 55 that are connected to the network 67 via network cables 66.

While not shown in FIG. 1, the operating panel 54 is provided on the top surface of the main casing 2. The operating panel 54 includes the settings unit 68 and a display unit 69.

The settings unit 68 is configured of a liquid crystal touch panel. A hierarchical menu is displayed on the touch panel. By selecting print conditions in sequence according to the hierarchy, the user can set various print conditions and the like.

Figure 3A:
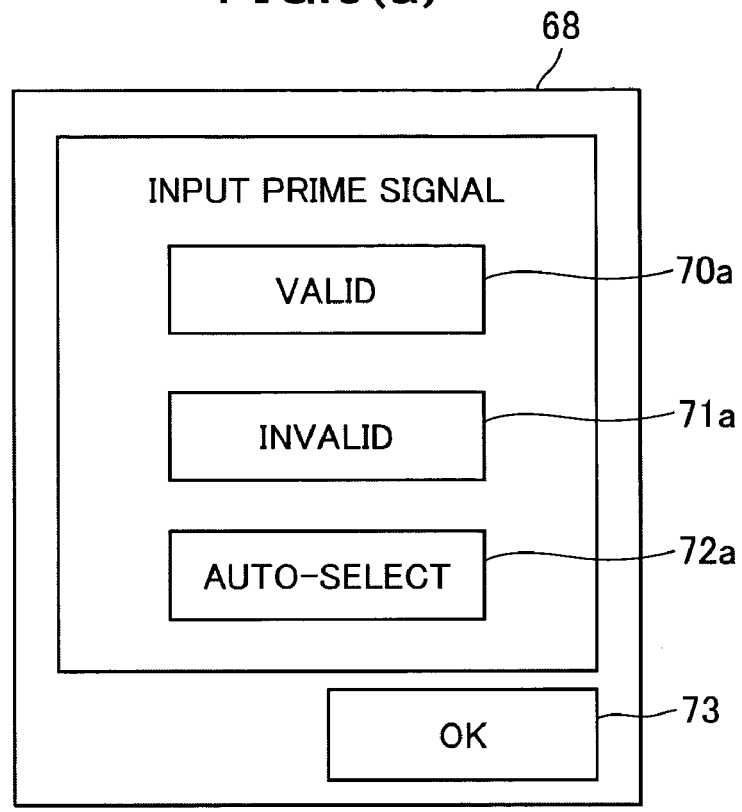
FIG. 3(*a*) is an explanatory diagram showing an example view in a touch panel of the laser printer in FIG. 1.

As shown in FIG. 3(a), for example, the settings unit 68 can display a screen enabling the user to select a control method for the reset process described later. In this screen, the settings unit 68 displays a Valid button 70a, an Invalid button 71a, and an Auto-select button 72a for the input prime signal. The user selects one of these buttons by pressing the corresponding button on the touch panel 68 and confirms the selection by pressing an OK button 73. This selection will be judged during the selection steps S2 and S3 in the reset process control process (FIG. 4). In this way, the user can easily and reliably set a desired mode from among an input prime signal valid mode, an input prime signal invalid mode, and an auto-select mode to be described later.

It is sufficient that the settings unit 68 displays at least two from among the three buttons 70a, 71a, and 72a. By selecting one of the at least two buttons or by selecting no button, the user can designate his/her desire to bring the laser printer 1 into either one of the three modes (input prime signal valid mode, input prime signal invalid mode, and auto-select mode).

Figure 3B:
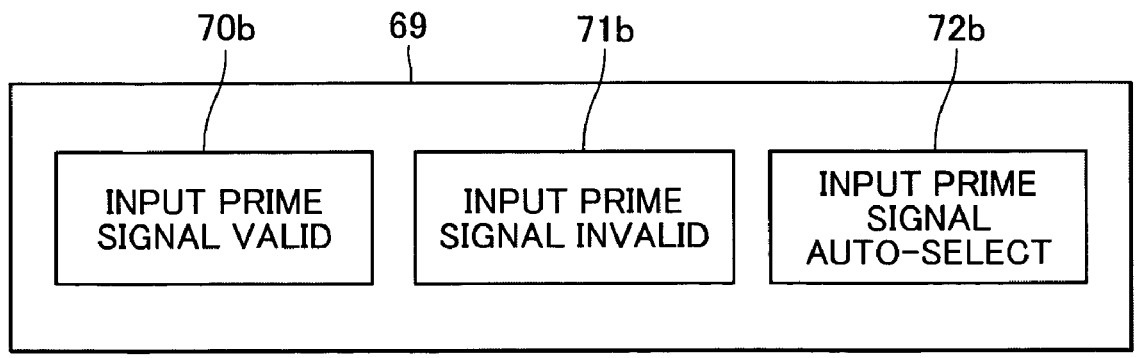

The display unit 69 is configured of a liquid crystal display for displaying various print conditions selected in the settings unit 68. As shown in FIG. 3(*b*), for example, the display unit 69 can display an input prime signal valid display 70*b*, an input prime signal invalid display 71*b*, and an input prime signal auto-select display 72*b*, and highlight one of the displays based on the selection in the settings unit 68. The input prime signal valid display 70*b* indicates that the laser printer 1 is in the input prime signal valid mode, that is, in a state in which the input prime signal is valid. The input prime signal invalid display 71*b* indicates that the laser printer 1 is in the input prime signal invalid mode, that is, in a state in which the input prime signal is invalid. The input prime signal auto-select display 72*b* indicates that the laser printer 1 is in the auto-select mode, that is, in a state in which the validity of the input prime signal is selected automatically. In this way, the user can easily confirm from this display which mode the user has selected on the settings unit 68.

Print jobs are inputted into the interface 53 of the laser printer 1 from the personal computers 55 via the parallel interface cable 65 and the network cable 66. The CPU 57 controls the mechanical components in the engine 51 and executes a printing process in the manner described above based on the print control program in the ROM 59.

An input prime signal is inputted to the parallel interface port 63 from one personal computer 55 via the parallel interface cable 65. The CPU 57 monitors the parallel interface cable 65 for the input prime signal. The CPU 57 begins the reset process control process of FIG. 4 according to the reset process control program when an input prime signal is inputted via the parallel interface cable 65.

At the beginning of the reset process control process, as shown in FIG. 4, the CPU 57 determines in S1 whether both of the parallel interface port 63 and network interface port 64 are connected to the parallel interface cable 65 and network cable 66, respectively.

If the parallel interface cable 65 and network cable 66 are connected to the parallel interface port 63 and network interface port 64 (S1: YES), then the CPU 57 executes the input prime signal invalid mode auto-select program. Based on this program, the CPU 57 sets the input prime signal invalid mode and ends the process of the reset process control program. Accordingly, even if an input prime signal is inputted into the laser printer 1, the signal is ignored, preventing the execution of the reset process of FIG. 5. Hence, when the parallel interface cable 65 is connected to the parallel interface port 63 and the network cable 66 is connected to the network interface port 64, the input prime signal invalid mode auto-select program automatically selects the input prime signal invalid mode. Even when an input prime signal is received by the parallel interface port 63, the input prime signal is ignored. Print jobs inputted from the personal computer 55 to the network interface port 64 are not reset by this input prime signal. This prevents the print jobs from being reset undesirably.

On the other hand, if the parallel interface cable 65 is connected to the parallel interface port 63 but the network cable 66 is not connected to the network interface port 64 (S1: NO), then the CPU 57 executes the input prime signal invalid mode selection program. That is, the CPU 57 determines in S2 whether the input prime signal invalid mode has been designated by the user on the settings unit 68.

If the input prime signal invalid mode has been designated by the user (S2: YES), then the CPU 57 sets the input prime signal invalid mode and ends the process of the reset process control program. Hence, even if an input prime signal is inputted into the laser printer 1, the signal is ignored, preventing execution of the reset process of FIG. 5. In this way, if the user does not wish to execute a reset process with the reset process program of FIG. 5, the user selects the input prime signal invalid mode, thereby preventing the reset process from being executed even when an input prime signal is inputted. It is ensured that the reset process is not executed at times undesirable for the user, and the number of unnecessary processes can be reduced.

On the other hand, if the input prime signal invalid mode has not been designated by the user (S2: NO), then the CPU 57 executes the input prime signal valid mode selection program. That is, the CPU 57 determines in S3 whether the input prime signal valid mode has been designated by the user on the settings unit 68.

If the input prime signal valid mode has been designated by the user (S3: YES), then the CPU 57 sets the input prime signal valid mode.

As a result, in S5, the CPU 57 executes the reset process program (FIG. 5) based on the inputted input prime signal and executes the reset process.

Figure 5:
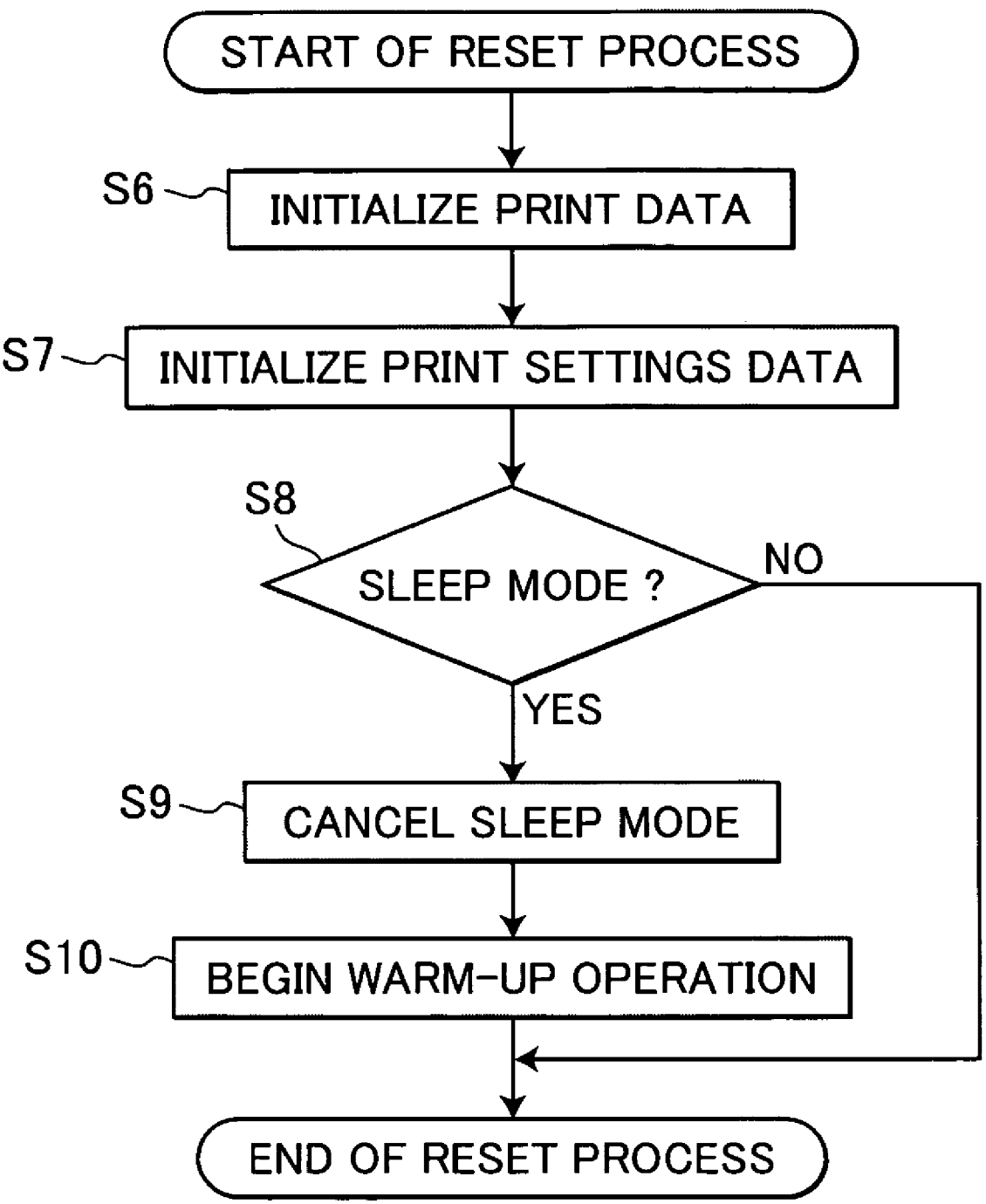
FIG. 5 is a flowchart showing the steps executed according to a reset process program.

At the beginning of this reset process, as shown in FIG. 5, the CPU 57 executes a print data initialization program in S6. By executing this program, the CPU 57 initializes the print data in the print jobs stored in the RAM 60.

It is now assumed that a print job including five pages of print data has been transmitted to the laser printer 1 from the personal computer 55, and the user inputs a cancel command to the personal computer 55 after the laser printer 1 has completed printing two pages worth of print data among the five pages of print data. Accordingly, the personal computer 55 transmits an input prime signal to the laser printer 1. Upon receiving this input prime signal, the laser printer 1 ends the printing process at that point (that is, the point at which two pages worth of printing have been completed). The CPU 57 deletes the remaining three pages worth of print data from the RAM 60.

In S7 the CPU 57 executes a print settings data initialization program to initialize the print settings data stored in the RAM 60 (such as settings for paper size and single-sided or duplex printing).

In S8 the CPU 57 executes a sleep mode control program to determine whether the sleep mode has been set. In other words, the CPU 57 judges whether the laser printer 1 is now in the sleep mode.

If the sleep mode has been set (S8: YES), then in S9 the CPU 57 cancels the sleep mode setting.

In S10 the CPU 57 executes the warm-up process program to begin a warm-up operation for preparing the laser printer 1 to print. More specifically, the feeder unit 4 does not start feeding a sheet of the paper 3, but the CPU 57 idly rotates the agitator 36, supply roller 33, developing roller 31, and photosensitive drum 27. As a result, the mechanical components are initialized and a reliable reset process is executed. Subsequently, the process of the reset process program ends.

On the other hand, if the sleep mode has not been set (S8: NO), then the CPU 57 does not cancel the sleep mode setting and does not begin the warm-up operation. Hence, the process of the reset process program is ended with no further action.

In S3 of FIG. 4, if the input prime signal valid mode has not been designated by the user on the settings unit 68 (S3: NO), then the CPU 57 sets the auto-select mode and executes the auto-select program. That is, in S4 the CPU 57 executes the sleep mode control program to determine whether the sleep mode has been set.

If the sleep mode has not been set (S4: NO), then the CPU 57 sets the input prime signal valid mode automatically, and proceeds to S5. In S5 the CPU 57 executes the reset process of FIG. 5 based on the inputted input prime signal. During the reset process of S5, since the sleep mode has not been set (S8: NO), the process of the reset process control program ends without executing S9 or S10.

On the other hand, if the sleep mode has been set (S4:YES), then the CPU 57 sets the input prime signal invalid mode automatically. As a result, the CPU 57 ignores the input prime signal and ends the process of the reset process control program.

Thus, when the auto-select program is executed in the reset process control program, the input prime signal valid mode is selected when the laser printer 1 is not in sleep mode. Accordingly, the laser printer 1 executes the reset process of FIG. 5 in response to an input prime signal. However, the input prime signal invalid mode is selected when the laser printer 1 is in sleep mode. As a result, the laser printer 1 ignores input prime signals. In this way, the user can prevent undesirable execution of the reset process, thereby reducing the number of unnecessary processes and lowering the running cost.

According to the present embodiment, the user can select either the input prime signal valid mode or the input prime signal invalid mode by pressing the Valid button 70a or the Invalid button 71a in the settings unit 68. If the user desires the laser printer 1 to execute the reset process according to the reset process program (FIG. 5) upon receiving input of an input prime signal, the user selects the input prime signal valid mode by pressing the Valid button 70a. On the other hand, if the user does not desire the laser printer 1 to execute the reset process according to the reset process program, the user selects the input prime signal invalid mode by pressing the Invalid button 71a. If the user selects the input prime signal invalid mode by pressing the Invalid button 71a, the reset process will not be executed upon receiving input of an input prime signal. Hence, the user can prevent execution of the reset process at his/her undesirable timing and can reduce the number of unnecessary processes.

The user can set the auto-select mode by pressing the Auto-select button 72a in the settings unit 68, whereby the auto-select program is executed. In this mode, the input prime signal valid mode is automatically selected when the laser printer 1 has not entered sleep mode. Accordingly, the reset process is executed upon receiving input of an input prime signal. On the other hand, the input prime signal invalid mode is automatically selected when the laser printer 1 is in sleep mode. Accordingly, input prime signals are ignored, and the reset process is not executed. Hence, when the user selects the auto-select mode, the reset process is never executed while the laser printer 1 is in the sleep mode, even when an input prime signal is inputted. As a result, the sleep state of the laser printer 1 can be maintained.

As described above, according to the present embodiment, if the input prime signal valid mode has been selected by the user, the reset process is initiated when the laser printer 1 receives an input prime signal during the sleep mode. The sleep state is canceled by the sleep mode control program and the warm-up process is initiated.

On the other hand, if the input prime signal invalid mode has been selected by the user, even when the laser printer 1 receives an input prime signal during sleep mode, the sleep state is not canceled by the sleep mode control program and the reset process is not initiated.

If the auto-select mode has been selected by the user, if an input prime signal is inputted when the laser printer 1 is not in sleep mode, the reset process is initiated. Contrarily, when the laser printer 1 is in sleep mode, the sleep state of the laser printer 1 is maintained even if an input prime signal is inputted.

In this way, when the user specifies the auto-select mode, an appropriate mode can be automatically selected based on the operating status of the laser printer 1. The same effects are obtained when the personal computer 55 is powered on, causing an input prime signal to be inputted into the laser printer 1. That is, when power to the personal computer 55 is turned on, the personal computer 55 transmits an input prime signal to the laser printer 1, but the laser printer 1 does not always perform the reset process upon receiving the input prime signal in the parallel interface port 63. The laser printer 1 always performs the reset process if the user has designated the input prime signal valid mode, always fails to perform the reset process if the user has designated the input prime signal invalid mode, and performs the reset process selectively dependently on whether the laser printer 1 is in the sleep mode if the user has designated the auto-select mode. As a result, the user can prevent undesirable execution of the reset process during the sleep mode. It is noted that the laser printer 1 always fails to perform the reset process if both of the ports 63 and 64 are connected to the cables 65 and 66, respectively, regardless of whether the user has designated any modes and regardless of whether the laser printer 1 is in sleep mode.

While the invention has been described in detail with reference to the specific embodiment thereof, it would be apparent to those skilled in the art that various changes and modifications may be made therein without departing from the spirit of the invention.

For example, the present invention can also be applied to an inkjet printer or the like.

Further, in the embodiment described above, the user selectively specifies whether to execute the input prime signal valid mode selection program (S2), the input prime signal invalid mode selection program (S3), or the auto-select program (S4) during the reset process control program by pressing one of the Valid button 70a, Invalid button 71a, and Auto-select button 72a on the settings unit 68 of the laser printer 1. However, the user may select one of these programs by inputting a selection from a personal computer 55 that is connected to the parallel interface port 63 via the parallel interface cable 65 or that is connected to the network interface port 64 via the network cable 66.

What is claimed is:

1. An image forming device connected to an external device, the image forming device comprising:
an image forming unit forming images on a recording medium;
a reception unit receiving a reset signal transmitted from an external device;
a reset process unit executing a reset process to reset the image forming unit;
a reset process control unit selectively controlling the reset process unit to execute the reset process in a manner that the reset process control unit controls, during a reset signal valid mode, the reset process unit to execute the reset process upon receipt of the reset signal and that the reset process control unit ignores, during a reset signal invalid mode, input of the reset signal, and fails to control the reset process unit to execute the reset process;
a sleep mode control unit bringing the image forming unit into a sleep mode when no print job is inputted within a prescribed time after the image forming unit has completed a printing process, the image forming unit being capable of receiving a print job during the sleep mode and consuming power less than while the image forming unit is executing a printing process;

a sleep-mode judging unit judging, when the reception unit, receives the reset signal, whether or not the image forming unit is in the sleep mode; and an auto-select mode setting unit setting the reset process control unit into either one of the reset signal valid mode and the reset signal invalid mode automatically dependent upon the determined results of the sleep-mode judging unit.

2. An image forming device according to claim 1, further comprising:

a selecting unit enabling a user to select one mode from among the reset signal valid mode and the reset signal invalid mode;

a reset signal valid mode setting unit judging, when the reception unit receives the reset signal, whether or not the user has selected the reset signal valid mode, and setting the reset process control unit into the reset signal valid mode when the user has selected the reset signal valid mode; and a reset signal invalid mode setting unit judging, when the reception unit receives the reset signal, whether or not the user has selected the reset signal invalid mode, and setting the reset process control unit into the reset signal invalid mode when the user has selected the reset signal invalid mode.

3. An image forming device according to claim 2, wherein the selecting unit enables the user to select one mode from among the reset signal valid mode, the reset signal invalid mode, and an auto-select mode, the auto-select mode setting unit performing its setting operation when the user has selected the auto-select mode.

4. An image forming device according to claim 3, further comprising a display unit displaying results of the user's selection attained by the selecting unit.

5. An image forming device according to claim 1, wherein when the sleep-mode judging unit determines that the image forming unit is being in the sleep mode, the reset process control unit in the reset signal valid mode controls the sleep mode control unit to cancel the sleep mode and controls the reset process unit to execute the reset process, and wherein when the sleep-mode judging unit determines that the image forming unit is being in the sleep mode, the reset process control unit in the reset signal invalid mode controls the sleep mode control unit to fail to cancel the sleep mode and the reset process unit to fail to execute the reset process.

6. An image forming device according to claim 1, wherein the auto-select mode setting unit sets the reset process control unit into the reset signal valid mode when the sleep-mode judging unit determines that the image forming unit is not in the sleep mode, the auto-select mode setting unit setting the reset process control unit into the reset signal invalid mode when the sleep-mode judging unit determines that the image forming unit is in the sleep mode.

7. An image forming device according to claim 1, wherein the reception unit receives the reset signal from the external device at least when power to the external device is turned on.

8. An image forming device according to claim 1, further comprising:

a warm-up process unit executing a warm-up operation for controlling the image forming unit to perform preparation operation for the printing process, wherein the reset process unit executes as the reset process a print data initialization process for initializing print data, a print settings data initialization process for initializing print settings data, and a warm-up operation initiation process for directing the warm-up process unit to begin a warm-up operation.

9. An image forming device according to claim 1, wherein the reception unit receives the reset signal, which is transmitted from the external device via a parallel interface cable.

10. An image forming device according to claim 1, wherein the reception unit includes:

a parallel interface port capable of connecting to the parallel interface cable; and a network port capable of connecting to a network cable; and the image forming device further comprises a reset signal invalid mode auto-select unit automatically setting the reset process control unit into the reset signal invalid mode when the parallel interface cable is connected to the parallel interface port and the network cable is connected to the network port.

* * * * *